(12) United States Patent
Sato

(10) Patent No.: US 11,206,158 B2
(45) Date of Patent: Dec. 21, 2021

(54) COMMUNICATION DEVICE AND METHOD

(71) Applicant: TOSHIBA MEMORY CORPORATION, Minato-ku (JP)

(72) Inventor: Kiyohito Sato, Kawasaki (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 0 days.

(21) Appl. No.: 16/553,617

(22) Filed: Aug. 28, 2019

(65) Prior Publication Data

US 2020/0304349 A1 Sep. 24, 2020

(30) Foreign Application Priority Data

Mar. 20, 2019 (JP) .............................. JP2019-052276

(51) Int. Cl.
*H04L 25/03* (2006.01)
*H04L 29/06* (2006.01)

(52) U.S. Cl.
CPC ........ *H04L 25/03057* (2013.01); *H04L 69/24* (2013.01); *H04L 2025/03815* (2013.01)

(58) Field of Classification Search
CPC ............... H04L 25/03057; H04L 69/24; H04L 2025/03815
See application file for complete search history.

(56) References Cited

U.S. PATENT DOCUMENTS

| | | | | |
|---|---|---|---|---|
| 6,618,338 B1 * | 9/2003 | Fujiwara | .......... | G11B 20/10009 369/124.13 |
| 8,718,126 B2 | 5/2014 | Cheung | | |
| 9,645,965 B2 | 5/2017 | Das Sharma et al. | | |
| 9,825,787 B1 * | 11/2017 | Burton | ............. | G11B 20/10046 |
| 2014/0269881 A1 * | 9/2014 | He | ..................... | H04L 25/03878 375/231 |
| 2014/0307766 A1 * | 10/2014 | Karim | ............... | H04L 25/03019 375/232 |
| 2019/0044760 A1 * | 2/2019 | Chiang | ............. | H04L 25/03878 |

FOREIGN PATENT DOCUMENTS

| | | |
|---|---|---|
| JP | 2011-130231 A | 6/2011 |
| JP | 2011-151755 A | 8/2011 |
| JP | 2014-183583 A | 9/2014 |

* cited by examiner

*Primary Examiner* — David S Huang
(74) *Attorney, Agent, or Firm* — Oblon, McClelland, Maier & Neustadt, L.L.P.

(57) ABSTRACT

According to one embodiment, a communication device includes a control circuit. The control circuit determines an output waveform of the data to be received from an external device. The control circuit stores information relating to the output waveform into a nonvolatile memory in response to determining of the output waveform of the data from among N (N is a natural number of three or more) types of output waveforms. The control circuit determines an output waveform of the data from among M or less types of output waveforms in the N types of output waveforms (M<N) (M is a natural number of N−2 or more) based on the information stored in the nonvolatile memory, when the information is stored in the nonvolatile memory.

19 Claims, 12 Drawing Sheets

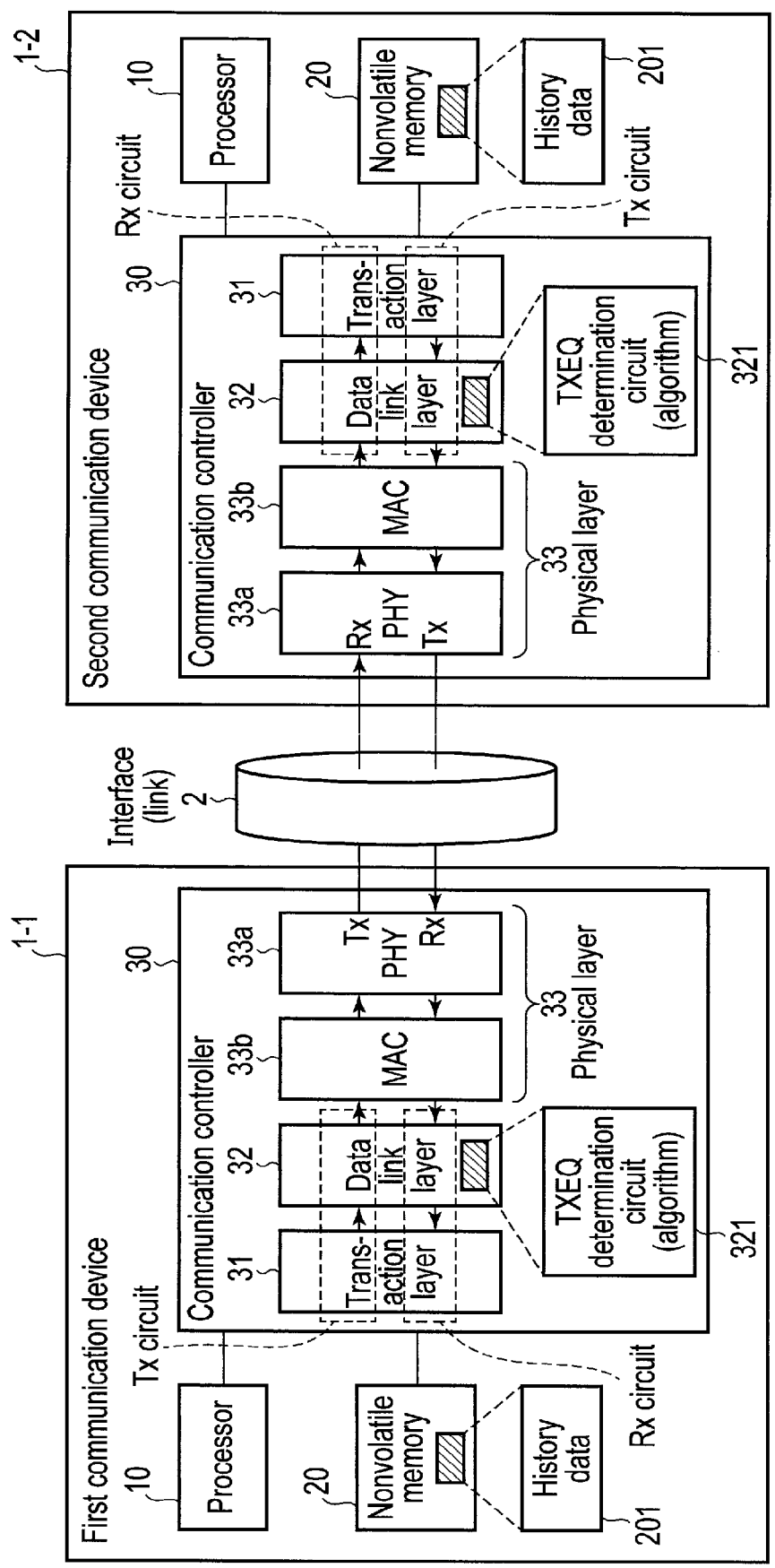
F I G. 1

| PS | DE | | | | | | | | |
|---|---|---|---|---|---|---|---|---|---|
| | BOOST | 0/24 | 1/24 | 2/24 | 3/24 | 4/24 | 5/24 | 6/24 | 7/24 | 8/24 |
| | 0/24 | 0.0  0.0 / 0.0 | 0.0  -0.8 / 0.8 | 0.0  -1.6 / 1.6 | 0.0  -2.5 / 2.5 | 0.0  -3.5 / 3.5 | 0.0  -4.7 / 4.7 | 0.0  -6.0 / 6.0 | 0.0  -7.6 / 7.6 | 0.0  -9.5 / 9.5 |
| | 1/24 | 0.8  0.0 / 0.8 | 0.8  -0.8 / 1.6 | 0.9  -1.7 / 2.5 | 1.0  -2.8 / 3.5 | 1.2  -3.9 / 4.7 | 1.3  -5.3 / 6.0 | 1.6  -6.8 / 7.6 | 1.9  -8.8 / 9.5 | |
| C-1 | 2/24 | 1.6  0.0 / 1.6 | 1.7  -0.9 / 2.5 | 1.9  -1.9 / 3.5 | 2.2  -3.1 / 4.7 | 2.5  -4.4 / 6.0 | 2.9  -6.0 / 7.6 | 3.5  -8.0 / 9.5 | | |
| | 3/24 | 2.5  0.0 / 2.5 | 2.8  -1.0 / 3.5 | 3.1  -2.2 / 4.7 | 3.5  -3.5 / 6.0 | 4.1  -5.1 / 7.6 | 4.9  -7.0 / 9.5 | | | |
| | 4/24 | 3.5  0.0 / 3.5 | 3.9  -1.2 / 4.7 | 4.4  -2.5 / 6.0 | 5.1  -4.1 / 7.6 | 6.0  -6.0 / 9.5 | | | | |
| | 5/24 | 4.7  0.0 / 4.7 | 5.3  -1.3 / 6.0 | 6.0  -2.9 / 7.6 | 7.0  -4.9 / 9.5 | | | | | |
| | 6/24 | 6.0  0.0 / 6.0 | 6.8  -1.6 / 7.6 | 8.0  -3.5 / 9.5 | | | | | | |

FIG. 2

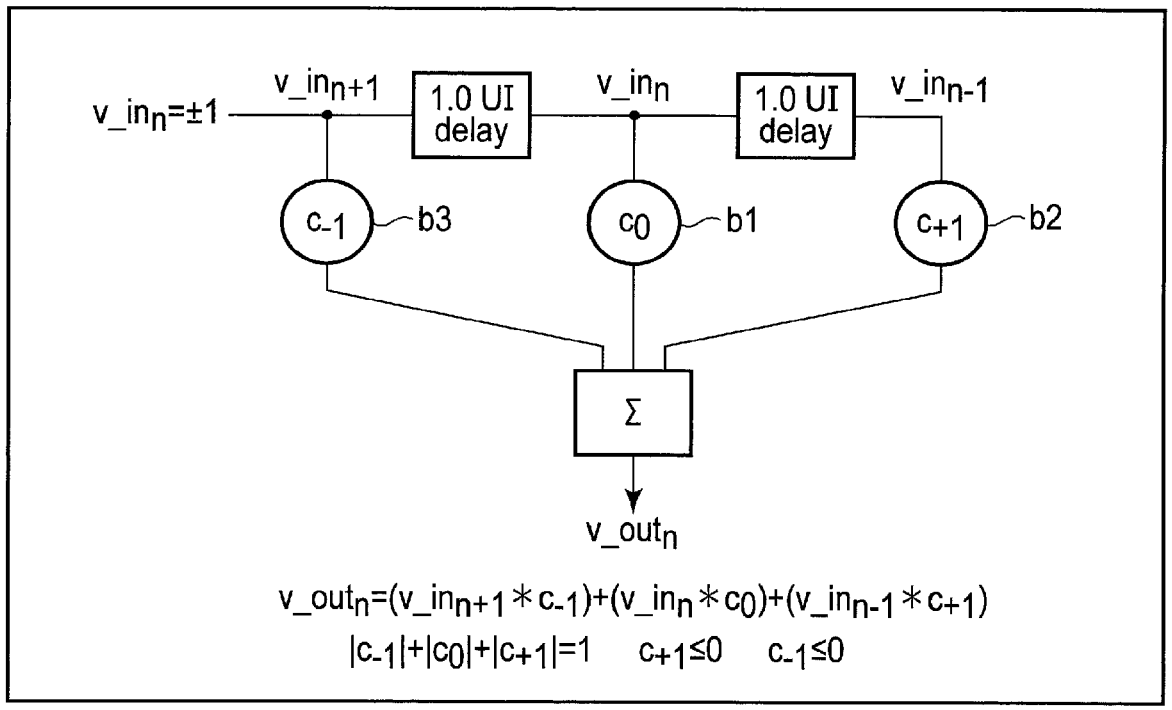
F I G. 3
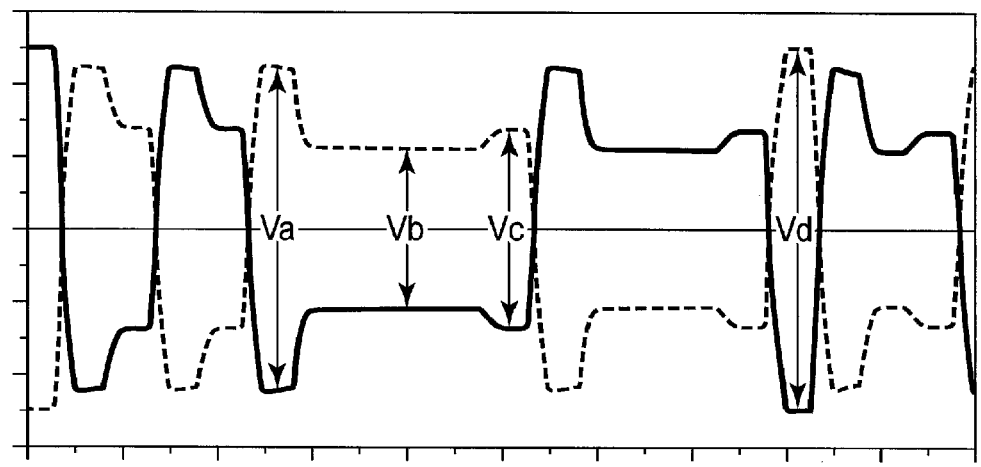
De-emphasis = $20\log_{10} Vb/Va$
Preshoot = $20\log_{10} Vc/Vb$
Boost = $20\log_{10} Vd/Vb$
F I G. 4

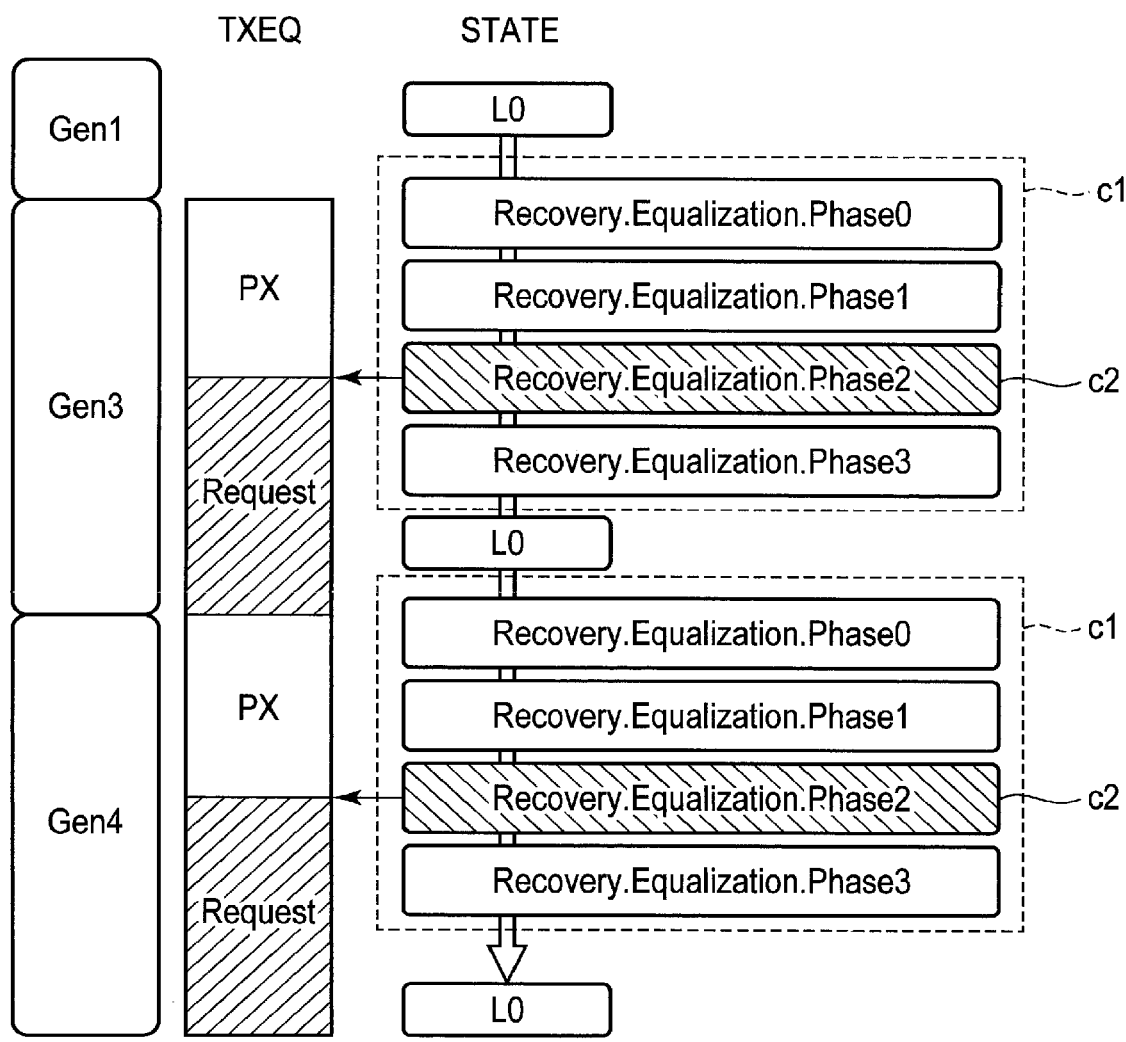
F I G. 6

| PS \ DE | 0/24 | 1/24 | 2/24 | 3/24 | 4/24 | 5/24 | 6/24 | 7/24 | 8/24 |
|---|---|---|---|---|---|---|---|---|---|
| BOOST 0/24 | 0.0  0.0<br>0.0 | 0.0  -0.8<br>0.8 | 0.0  -1.6<br>1.6 | 0.0  -2.5<br>2.5 | 0.0  -3.5<br>3.5 | 0.0  -4.7<br>4.7 | 0.0  -6.0<br>6.0 | 0.0  -7.6<br>7.6 | 0.0  -9.5<br>9.5 |
| 1/24 | 0.8  0.0<br>0.8 | 0.8  -0.8<br>1.6 | 0.9  -1.7<br>2.5 | 1.0  -2.8<br>3.5 | 1.2  -3.9<br>4.7 | 1.3  -5.3<br>6.0 | 1.6  -6.8<br>7.6 | 1.9  -8.8<br>9.5 | |
| 2/24 | 1.6  0.0<br>1.6 | 1.7  -0.9<br>2.5 | 1.9  -1.9<br>3.5 | 2.2  -3.1<br>4.7 | 2.5  -4.4<br>6.0 | 2.9  -6.0<br>7.6 | 3.5  -8.0<br>9.5 | | |
| C-1 3/24 | 2.5  0.0<br>2.5 | 2.8  -1.0<br>3.5 | 3.1  -2.2<br>4.7 | 3.5  -3.5<br>4.7 | 4.1  -5.1<br>7.6 | 4.9  -7.0<br>9.5 | | | |
| 4/24 | 3.5  0.0<br>3.5 | 3.9  -1.2<br>4.7 | 4.4  -2.5<br>6.0 | 5.1  -4.1<br>7.6 | 6.0  -6.0<br>9.5 | | | | |
| 5/24 | 4.7  0.0<br>4.7 | 5.3  -1.3<br>6.0 | 6.0  -2.9<br>7.6 | 7.0  -4.9<br>9.5 | | | | | |
| 6/24 | 6.0  0.0<br>6.0 | 6.8  -1.6<br>7.6 | 8.0  -3.5<br>9.5 | | | | | | |

F I G. 8

| PS | DE | 0/24 | 1/24 | 2/24 | 3/24 | 4/24 | 5/24 | 6/24 | 7/24 | 8/24 |
|---|---|---|---|---|---|---|---|---|---|---|
| BOOST | 0/24 | 0.0  0.0 / 0.0 | 0.0  -0.8 / 0.8 | 0.0  -1.6 / 1.6 | 0.0  -2.5 / 2.5 | 0.0  -3.5 / 3.5 | 0.0  -4.7 / 4.7 | 0.0  -6.0 / 6.0 | 0.0  -7.6 / 7.6 | 0.0  -9.5 / 9.5 |
| | 1/24 | 0.8  0.0 / 0.8 | 0.8  -0.8 / 1.6 | 0.9  -1.7 / 2.5 | 1.0  -2.8 / 3.5 | 1.2  -3.9 / 4.7 | 1.3  -5.3 / 6.0 | 1.6  -6.8 / 7.6 | 1.9  -8.8 / 9.5 | |
| | 2/24 | 1.6  0.0 / 1.6 | 1.7  -0.9 / 2.5 | 1.9  -1.9 / 3.5 | 2.2  -3.1 / 4.7 | 2.5  -4.4 / 6.0 | 2.9  -6.0 / 7.6 | 3.5  -8.0 / 9.5 | | |
| C-1 | 3/24 | 2.5  0.0 / 2.5 | 2.8  -1.0 / 3.5 | 3.1  -2.2 / 4.7 | 3.5  -3.5 / 7.0 | 4.1  -5.1 / 7.6 | 4.9  -7.0 / 9.5 | | | |
| | 4/24 | 3.5  0.0 / 3.5 | 3.9  -1.2 / 4.7 | 4.4  -2.5 / 6.0 | 5.1  -4.1 / 7.6 | 6.0  -6.0 / 9.5 | | | | |
| | 5/24 | 4.7  0.0 / 4.7 | 5.3  -1.3 / 6.0 | 6.0  -2.9 / 7.6 | 7.0  -4.9 / 9.5 | | | | | |
| | 6/24 | 6.0  0.0 / 6.0 | 6.8  -1.6 / 7.6 | 8.0  -3.5 / 9.5 | | | | | | |

FIG. 9

| PS\DE | 0/24 | 1/24 | 2/24 | 3/24 | 4/24 | 5/24 | 6/24 | 7/24 | 8/24 |
|---|---|---|---|---|---|---|---|---|---|
| BOOST 0/24 | 0.0 0.0 / 0.0 | 0.0 -0.8 / 0.8 | 0.0 -1.6 / 1.6 | 0.0 -2.5 / 2.5 | 0.0 -3.5 / 3.5 | 0.0 -4.7 / 4.7 | 0.0 -6.0 / 6.0 | 0.0 -7.6 / 7.6 | 0.0 -9.5 / 9.5 |
| 1/24 | 0.8 0.0 / 0.8 | 0.8 -0.8 / 1.6 | 0.9 -1.7 / 2.5 | 1.0 -2.8 / 3.5 | 1.2 -3.9 / 4.7 | 1.3 -5.3 / 6.0 | 1.6 -6.8 / 7.6 | 1.9 -8.8 / 9.5 | |
| 2/24 | 1.6 0.0 / 1.6 | 1.7 -0.9 / 2.5 | 1.9 -1.9 / 3.5 | 2.2 -3.1 / 4.7 | 2.5 -4.4 / 6.0 | 2.9 -6.0 / 7.6 | 3.5 -8.0 / 9.5 | | |
| C-1  3/24 | 2.5 0.0 / 2.5 | 2.8 -1.0 / 3.5 | 3.1 -2.2 / 4.7 | 3.5 -3.5 / 4.7 | 4.1 -5.1 / 7.6 | 4.9 -7.0 / 9.5 | | | |
| 4/24 | 3.5 0.0 / 3.5 | 3.9 -1.2 / 4.7 | 4.4 -2.5 / 6.0 | 5.1 -4.1 / 7.6 | 6.0 -6.0 / 9.5 | | | | |
| 5/24 | 4.7 0.0 / 4.7 | 5.3 -1.3 / 6.0 | 6.0 -2.9 / 7.6 | 7.0 -4.9 / 9.5 | | | | | |
| 6/24 | 6.0 0.0 / 6.0 | 6.8 -1.6 / 7.6 | 8.0 -3.5 / 9.5 | | | | | | |

Min Reduced Swing Limit

Full Swing Limit or Max Reduced Swing Limit

F I G. 10

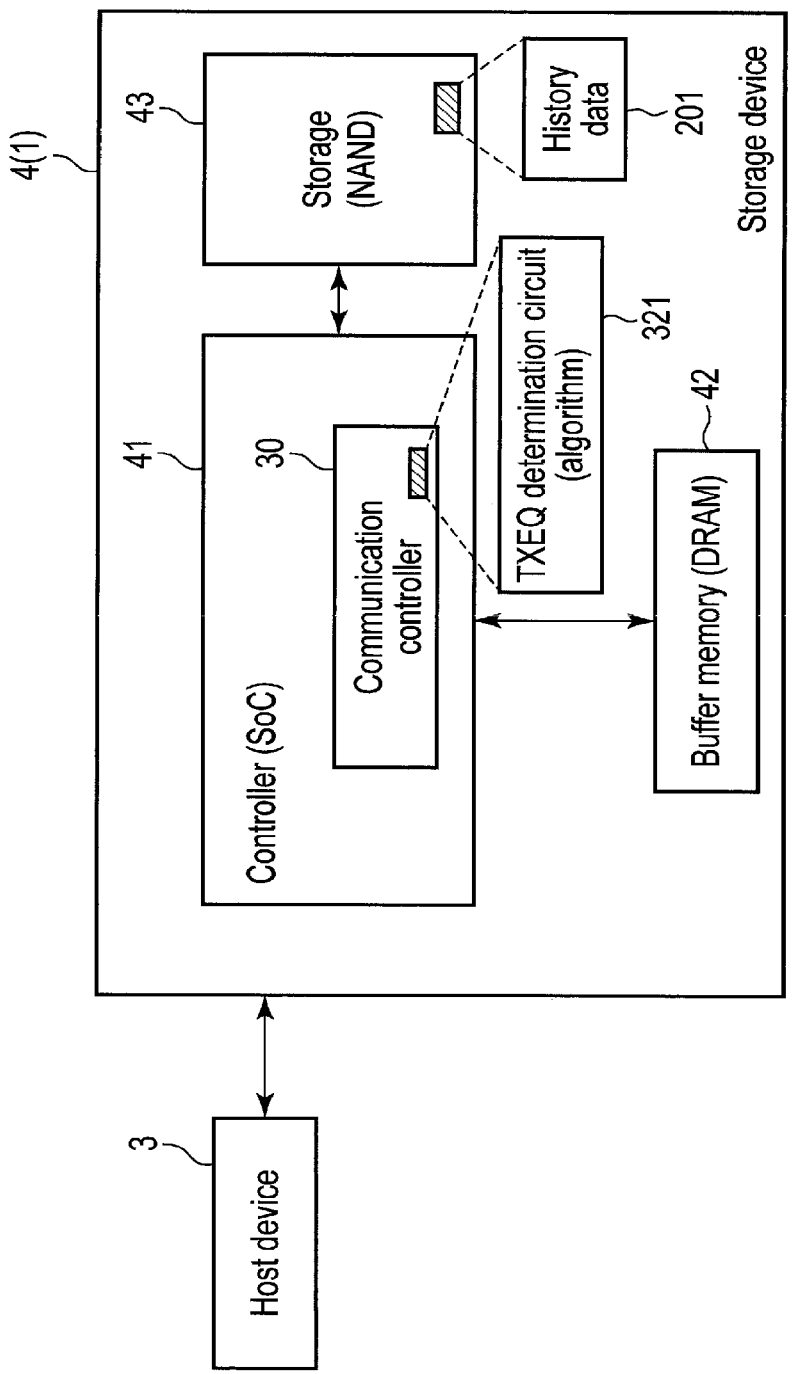
F I G. 12

COMMUNICATION DEVICE AND METHOD

CROSS-REFERENCE TO RELATED APPLICATIONS

This application is based upon and claims the benefit of priority from Japanese Patent Application No. 2019-052276, filed Mar. 20, 2019, the entire contents of which are incorporated herein by reference.

FIELD

Embodiments described herein relate generally to a communication device and a method.

BACKGROUND

Various interfaces for connecting devices, such as PCI Express (PCIe) (registered trademark) have recently become popular. Most of the standards of the interfaces require time to have negotiation between devices, then start of communications may delay.

BRIEF DESCRIPTION OF THE DRAWINGS

FIG. 1 is a block diagram showing an example of a configuration of a communication device according to an embodiment.

FIG. 2 is a table showing output waveforms of data of 42 types prepared as options in a serial interface to which the communication device according to the embodiment is applied.

FIG. 3 is a diagram showing addition of part of transmission data before and after one timing to data to be transmitted in the serial interface to which the communication device according to the embodiment is applied.

FIG. 4 is a graph showing characteristics of output waveforms of data in the serial interface to which the communication device according to the embodiment is applied.

FIG. 6 is a diagram showing a procedure to cause a link to transition to an L0 state at a fourth-generation PCIe specifications (Gen4) level by the communication device according to the embodiment.

FIG. 8 is a table illustrating peripheral Preset that is an option of the TXEQ determination circuit of the communication device according to the embodiment in the Equalization at stage 1.

FIG. 9 is a table illustrating peripheral Coefficient that is an option of the TXEQ determination circuit of the communication device according to the embodiment in the Equalization at stage 2.

FIG. 10 is a table illustrating Coefficient that is selected in the Equalization at stage 3 by the TXEQ determination circuit of the communication device according to the embodiment.

FIG. 12 is a block diagram showing an example in which the communication device according to the embodiment is achieved as a storage device.

DETAILED DESCRIPTION

Figure 5:
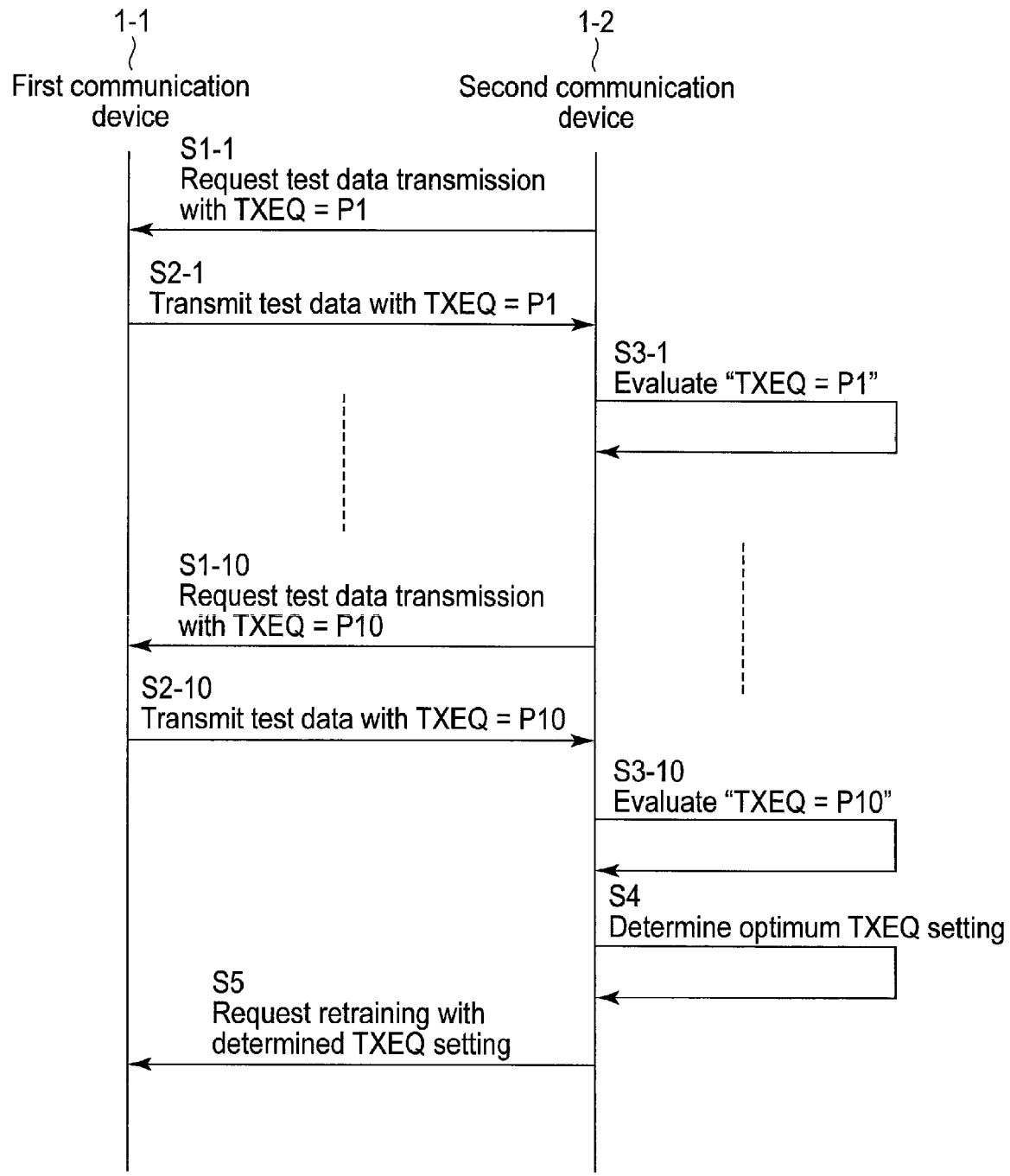
FIG. 5 is a chart showing a typical flow of Equalization that is a procedure for selecting an output waveform of data to be required to a communication partner by the communication device according to the embodiment.

Various embodiments will be described hereinafter with reference to the accompanying drawings.

In general, according to one embodiment, a communication device includes a nonvolatile memory, a reception circuit and a control circuit. The reception circuit is configured to receive data from an external device via an interface. The control circuit is configured to determine an output waveform of the data to be received from the external device by the reception circuit. The control circuit is configured to: store information relating to the output waveform into the nonvolatile memory in response to determining of the output waveform of the data from among N (N is a natural number of three or more) types of output waveforms; and determine an output waveform of the data from among M or less types of output waveforms in the N types of output waveforms (M<N) (M is a natural number of N−2 or more) based on the information stored in the nonvolatile memory, when the information is stored in the nonvolatile memory.

FIG. 1 is a block diagram showing an example of a configuration of a communication device (a first communication device 1-1 and a second communication device 1-2) according to an embodiment. The first communication device 1-1 and the second communication device 1-2 have a common communication function that conforms to a common interface standard. These devices 1-1 and 1-2 may be devices of the same type such as personal computers and devices of different types such as a personal computer and a peripheral device. Hereinafter, the first communication device 1-1 and the second communication 1-2 may be generically called a communication device 1.

As shown in FIG. 1, the first communication device 1-1 and the second communication device 1-2 are connected to each other via an interface 2. Assume in the present embodiment that the interface 2 is a serial interface that conforms to the PCIe standard. Incidentally, the PCIe standard is an example, and a configuration of the communication device 1 to shorten a time required for negotiation, which will be described later, can be applied to a variety of interface standards.

Also as shown in FIG. 1, the first communication device 1-1 and the second communication device 1-2, or the communication device 1 includes a processor 10, a nonvolatile memory 20 and a communication controller 30.

The processor 10 controls the operation of the communication controller 30 in order to receive and transmit data from and to its communication partner. Specifically, the processor 10 requests the communication controller 30 to process various transactions for data transmission or data reception. The nonvolatile memory 20 is a storage device capable of storing data including programs and history data 201 to be described later.

The communication controller 30 receives and transmits data via the interface 2 under the control of the processor 10. The communication controller 30 includes a transaction layer 31, a data link layer 32 and a physical layer 33. The physical layer 33 includes a physical sub-block (PHY) 33a and an MAC sub-block 33b.

The transaction Layer 31 processes various transactions required from the processor 10. Specifically, the transaction layer 31 constructs and processes a transaction layer packet (TLP). The TLP is a packet that is transferred between the transmission layer 31 of the communication partner and the transaction Layer 31.

The data link layer 32 is an intermediate layer between the transaction layer 31 and the physical layer 33, and manages a link contained in the interface 2 and constructs and processes a data link layer packet (DLLP). The DLLP is a packet that is transferred between the data link layer 32 of the communication partner and the data link layer 32. The interface 2, which is a serial interface that conforms to the PCIe standard, includes a link (serial link) that connects between devices. The link includes a plurality of lanes (lane 0, lane 1, . . . lane N). Each of the lanes includes a differential signal line pair (Tx+, Tx−) for transmission and a differential signal line pair (Rx+, Rx−) for reception. The first communication device 1-1 and the second communication device 1-2, which are connected via the interface 2, can receive data and transmit data in parallel via a link including a plurality of lanes (lane 0, lane 1, . . . lane N). In the PCIe standard, x1, x2, x4, x8, x12, x16 and x32 lanes are supported. For example, the link of the x4 lane includes lanes 0 to 3. The DLLP contains a DLLP for transmitting flow control information (such as Update FC DLLP), a DLLP for transmitting a positive response (acknowledge) (Ack DLLP), a DLLP for transmitting a negative response (retransmission request) (Nak DLLP), and the like.

The data link layer 32 includes a TXEQ determination circuit 321 by which a communication partner transmits data with the optimum output waveform to the physical layer 33 that receives and transmits data physically. The optimal output waveform varies with a transmission path constructed with the communication partner, specifically, a combination of three elements of an own device, its partner device, and a cable. Also, the optimum output waveform can be different from an output waveform of data directed to the own device from the partner device and that of data directed to the partner device from the own device. The output waveform of data is determined by negotiation with the communication partner. As part of the negotiation, the TXEQ determination circuit 321 determines an output waveform of data which is required to the communication partner, from among a plurality of output waveforms provided as options. That is, the output waveform of data which the first communication device 1-1 transmits to the second communication device 1-2 (data which the second communication device 1-2 receives from the first communication device 1-1) is determined by the second communication device 1-2 that is a device on the reception side. On the other hand, an output waveform of data which the second communication device 1-2 transmits to the first communication device 1-1 (data which the first communication device 1-1 receives from the second communication device 1-2) is determined by the second communication device 1-2 that is a device on the reception side. The TXEQ determination circuit 321 includes a mechanism (algorithm) for determining an output waveform of data that is required of the communication partner in a short time. The mechanism of the TXEQ determination circuit 321 will be described later.

The physical layer 33 performs an interface operation of transmitting and receiving data physically through a plurality of lanes contained in the link. The physical layer 33 includes a variety of circuits for the interface operation. In the PCIe standard, as the circuits for the interface operation, there are a driver, an input buffer, a serializer, a deserializer, an encoder, a decoder, a scrambler, a descrambler, a byte align circuit, a byte striping circuit, a clock data recovery (CDR) circuit, and the like. The driver, serializer, encoder, scrambler, and byte striping circuit perform a data transmitting operation, and the input buffer, deserializer, decoders, descrambler, byte align circuit, and CDR circuit perform a data receiving operation.

The driver is a circuit that drives the differential signal line pair (Tx+, Tx−) for data transmission. The driver drives the differential signal line pair (Tx+, Tx−) so as to form an output waveform of data requested from the communication partner.

The input buffer is a circuit that receives data from the differential signal line pair (Rx+, Rx−) for reception and includes, for example, an equalizer. The equalizer allows the various output waveforms of data to be processed. In addition, the input buffer has a function of evaluating the quality of output waveforms of data.

The serializer converts the transmitted data from parallel data to serial data. The deserializer converts the received serial data into parallel data. The encoder encodes the transmitted data. The decoder decodes the received encoded data. The scrambler scrambles the transmitted data such that a length of the same continuous bit values becomes not longer than a fixed length, before the encoder encodes the transmitted data. The descrambler descrambles the scrambled received data to obtain the original data.

The byte striping circuit performs a byte striping operation. The byte striping operation is an operation of assigning a plurality of data items composing transmission data such as TLP and DLLP in sequence to a plurality of lanes in a predetermined unit. Since the physical layer 33 thus performs a framing operation, the data link layer 32 and the transaction layer 31 need not sense the lanes. Whereas the physical layer 33 includes a plurality of transmission circuits (Tx circuits) and a plurality of reception circuits (Rx circuits) to correspond to the lanes, the data link layer 32 and the transaction layer 31 each include one transmission circuit (Tx circuit) common to the lanes and one reception circuit (Rx circuit) common to the lanes.

Referring to FIGS. 2 to 4, the output waveforms of various data items prepared as options in standard, which is one of the causes to require time for negotiation between devices, will be described.

FIG. 2 is a table showing set values of the output waveforms of data of 42 types prepared as options in the serial interface that conforms to the PCIe standard. In the example of FIG. 2, the number of divisions of the driver is 24. In the PCIe, 24 to 63 can be taken as the number of divisions of the driver. Here is a description of a case where the number of division of the driver is 24.

In FIG. 2, $C_{+1}$ of the horizontal axis is a coefficient of data transmitted before one timing, which is added to data to be transmitted, and $C_{-1}$ of the vertical axis is a coefficient of data transmitted after one timing, which is added to the data to be transmitted. In the serial interface that conforms to the PCIe standard, as shown in FIG. 3, part $(C_{+1})$ b2 of data transmitted before one timing and part $(C_{-1})$ b3 of data to be transmitted after one timing are added into data $(C_0)$ b1 to be transmitted, and the data $(C_0)$ b1 is output. As shown in FIG. 2, the lower limit of coefficient $(C_{+1})$ of data transmitted before one timing, which is added to the data to be transmitted, is 0/24, and the upper limit thereof is 8/24. The lower limit of coefficient $(C_{-1})$ of data to be transmitted after one timing is 0/24, and the upper limit thereof is 6/24. Furthermore, the upper limit of the sum of coefficient $(C_{+1})$ of data transmitted before one timing and coefficient $(C_{-1})$ of data to be transmitted after one timing, which are added to the data ($C_0$) to be transmitted, is 8/24.

In FIG. 2, 42 frames placed at the intersections of $C_{+1}$ of the horizontal axis and $C_{-1}$ of the vertical axis represent set values of the output waveforms of data which are set by the combinations of $C_{+1}$ and $C_{-1}$. That is, in the serial interface that conforms to the PCIe standard, the output waveforms of 42 types of data can be set by two coefficients of $C_{+1}$ and $C_{-1}$. Three numbers are shown in each of the frames. The number in the upper left part corresponds to a value of Preshoot (PS) determined by $C_{+1}$ and $C_{-1}$, the number in the upper right part corresponds to a value of De-emphasis (DE) determined by $C_{+1}$ and $C_{-1}$, and the number in the lower central part corresponds to a value of Boost (BOOST) determined by $C_{+1}$ and $C_{-1}$. Preshoot, De-emphasis and Boost represent characteristics of the output waveforms of data, as shown in FIG. 4. The communication device 1 notifies the communication partner of, for example, the two coefficients $C_{+1}$ and $C_{-1}$ to request the communication partner to output data in the waveform of intended characteristics.

Furthermore, in FIG. 2, 10 frames of the sum of 6 frames hatched in the same manner as the frame indicated by symbol a1 and 4 frames hatched in the same manner as the frame indicated by symbol a2, represent 10 types of combinations of $C_{+1}$ and $C_{-1}$ designated in advance as Preset from among 42 types of combinations of $C_{+1}$ and $C_{-1}$. Originally, it is desirable to select the optimum combination of $C_{+1}$ and $C_{-1}$ from among the 42 types of combinations of $C_{+1}$ and $C_{-1}$, that is, the optimum waveform of the data; however, the time required for the selection can be shortened by narrowing the candidates. Of course, it is considered that the optimum output waveform of the data is excluded from the 10 types of combinations of $C_{+1}$ and $C_{-1}$ designated in advance as Preset; however, when priority is given to the shortening of required time for the selection, the optimum output waveform of the data is selected from among the 10 types of combinations of $C_{+1}$ and $C_{-1}$. Note that the 42 types of combinations of $C_{+1}$ and $C_{-1}$ are referred to as TXEQ setting or Coefficient. In other words, Preset is 10 types of Coefficients designated in advance from among 42 types of Coefficients. In addition, the procedure for selecting an output waveform of data requested from the communication partner in cooperation with the communication partner is referred to as Equalization. Furthermore, the act of searching a plurality of TXEQ settings for the optimum TXEQ setting in the procedure of Equalization is referred to as sweep.

Here, one comparative example will be described with reference to FIG. 5. FIG. 5 illustrates a typical flow of Equalization that is a procedure for selecting an output waveform of data which the second communication device 1-2 requests from the first communication device 1-1, for example, in the case where the first communication device 1-1 and the second communication device 1-2 start to communicate with each other via the interface 2. Since a typical flow of Equalization that is a procedure for selecting an output waveform of data which the first communication device 1-1 requests from the second communication device 1-2 is the same as above, its description will be omitted.

The second communication device 1-2 requests training in first Preset (TXEQ=P1) from the first communication device 1-1 (S1_1). Upon receiving the request, the first communication device 1-1 transmits test data corresponding to the first Preset to the second communication device 1-2 (S21). Upon receiving the test data, the second communication device 1-2 evaluates the waveform quality of the received data, specifically, the test data corresponding to the first Preset (S3_1).

The second communication device 1-2 repeats a process corresponding to S1_1 to S3_1 which are training in the first Preset (TXEQ=P1) 10 times from the first Preset (TXEQ=P1) to the tenth Preset (TXEQ=P10). In FIG. 5, S110 to S3_10 represent a process for the tenth Preset (TXEQ=P10).

When the second communication device 1-2 finishes a general evaluation of the first Preset (TXEQ=P1) through the tenth Preset (TXEQ=P10), it determines the most highly valued Preset as the optimum TXEQ setting from among the ten Presets (S4), and requests retraining in the determined TXEQ setting from the first communication device 1-1 (S5). In response to the request, the first communication device 1-1 transmits test data corresponding to the optimum TXEQ setting to the second communication device 1-2.

In order to cause a link to transition to an L0 state that is a normal state in which data can be received and transmitted in, for example, the fourth generation PCIe specifications (Gen4), it is necessary to cause the link to transition to the L0 state by Recovery. Equalization (c1) at the third generation PCIe specifications (Gen3) level and then cause the link to transition to the L0 state again by Recovery. Equalization (c1) at the Gen4 level, as shown in FIG. 6. In Phase 2 (c2) of the four Phases of Phase 0 to Phase 3 of Recovery. Equalization (c1), the first communication device 1-1 and the second communication device 1-2 need to cooperate with each other by the procedure as shown in FIG. 5, for example. That is, it may take time to have negotiation between devices, and the start of communications may be delayed. The communication device 1 of the present embodiment is therefore provided with a mechanism (algorithm) to shorten the time required for the negotiation, which will be described below.

Figure 7:
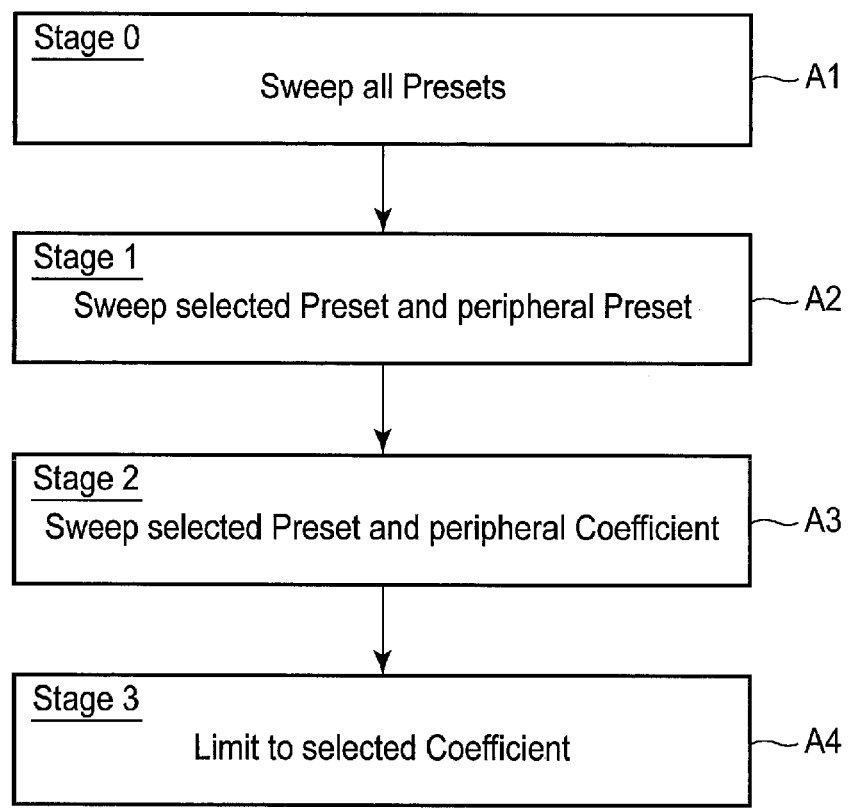
FIG. 7 is a flowchart of determining the optimum TXEQ setting by a TXEQ determination circuit of the communication device according to the embodiment.

As described above, the data link layer 32 of the communication device 1 of the present embodiment includes a TXEQ determination circuit 321 by which the physical layer 33 receives data in the optimum output waveform from the communication partner. When the TXEQ determination circuit 321 determines the optimum TXEQ setting from among the 42 types of TXEQ settings shown in FIG. 2 by Equalization, it manages four stages of stages 0 to 3 in, as shown in FIG. 7.

Stage 0 is a stage in which all the Presets are swept (A1), which is a typical flow of Equalization, as has been described with reference to FIG. 5. The stage 0 is the initial stage. The TXEQ determination circuit 321 first sweeps all the Presets at the stage 0 and determines the optimum Preset from among them. When the TXEQ determination circuit 321 determines the optimum Preset, it stores TXEQ setting information corresponding to the optimum Preset in the nonvolatile memory 20 as history data 201. The stage 0 is executed when the history data 201 is not stored in the nonvolatile memory 20. Usually, once the TXEQ determination circuit 321 sweeps all the Presets and determines the optimum Preset from among them, it proceeds to stage 1. The TXEQ determination circuit 321 also stores information as to which of the stages 0 to 3 corresponds to the state of the circuit 321 in the nonvolatile memory 20 as attribute information of the history data 201. The history data 201 is stored in the nonvolatile memory 20 such that it can identify the communication partner. In other words, the TXEQ determination circuit 321 can determine whether or not the history data 201 is stored in the nonvolatile memory 20, which of the stages 0 to 3 corresponds to the state of the circuit 321, etc., for each communication partner. The information (identifier) for identifying a communication partner is not limited to specific information but may include various types of information.

The stage 1 is a stage in which selected Preset and peripheral Preset are swept (A2). Since the history data 201 is stored in the nonvolatile memory 20, the TXEQ determination circuit 321 can refer to the history data 201 even though the communication device 1 is powered off and then powered on again.

The selected Preset in the stage 1 includes the last-determined Preset, the most determined Preset and the like, which are indicated by the history data 201. The Sweep of the peripheral Preset will be described with reference to FIG. 8.

In FIG. 8, a Preset in which a solid star is placed as indicated by symbol d1 is, for example, the last-determined Preset. When the TXEQ determination circuit 321 proceeds to the stage 1, it determines the optimum TXEQ setting from among the options of selected plurality of Presets in which the hollow stars are placed as indicated by symbol d2 are peripheral Presets. In FIG. 8, three Presets are selected as peripheral Presets. A method of selecting a peripheral Preset is not limited to a specific one, but may include a variety of methods. For example, a Preset in which the sum of a difference between selected Preset and a value of $C_{+1}$ and a difference between selected Preset and a value of $C_{-1}$ is not larger than a fixed value, may be selected as a peripheral Preset. The TXEQ determination circuit 321 sweeps the selected Preset and the three Presets.

Since, in stage 1, the number of Presets to be swept is decreased from 10 to 4, the time required to determine the optimum TXEQ setting is shortened.

Furthermore, the TXEQ determination circuit 321 can determine that the determined Preset has converged on a specific Preset with reference to the history data 201. This determination method is not limited to a specific one, but may include a variety of methods. For example, in the situation where the amount of accumulated history data 201 is not smaller than a fixed amount, if there is a Preset to be determined beyond a predetermined ratio, the TXEQ determination circuit 321 may determine that a Preset to be determined has converged on a specific Preset. The number of specific Presets is not limited to one but may be plural. As shown in FIG. 7, if, in the stage 1, the Preset to be determined converges on a specific Preset, the TXEQ determination circuit 321 shifts to the stage 2. Incidentally, when the TXEQ determination circuit 321 completes sweeping the selected Preset and the three Presets and selects one of the Presets, it may be shifted to the stage 2.

The stage 2 is a stage in which a selected Preset and a peripheral Coefficient are swept. The selected Preset in stage 2 is a specific Preset converged in stage 1, indicated by the history data 201. The Sweep of the peripheral Coefficient will be described with reference to FIG. 9.

In FIG. 9, a Preset in which a solid star is placed as indicated by symbol e1 is a selected Preset. When the TXEQ determination circuit 321 proceeds to the stage 2, it determines the optimum TXEQ setting from among the options of selected Preset and its peripheral Coefficients. It does not matter whether the Coefficient to be selected is a Preset or not. In FIG. 9, the Coefficient surrounded by a thick frame as indicated by symbol e2 is a peripheral Coefficient. A method of selecting the peripheral Coefficient is not limited to a specific one, but may include a variety of methods. For example, Coefficients of which one of the values of $C_{+1}$ and $C_{-1}$ is the same as that of the selected Preset and of which the value of the other adjacent to that of the selected Preset may be selected as peripheral Coefficients. It is assumed here that the output wavelength of data is set by two coefficients of $C_{+1}$ and $C_{-1}$. If, however, the output waveform of data is set by one coefficient, Coefficients of which the value of the one coefficient adjacent to that of the selected Preset may be selected as peripheral Coefficients. If, furthermore, the output waveform of data is set by three or more coefficients, (the number of coefficients×2) Coefficients of which the values of (the number of coefficients−1) coefficients is the same as that of the selected Preset and of which the value of the remaining one coefficient adjacent to that of the selected Preset may be selected as peripheral Coefficients.

In the stage 2, too, the time required to determine the optimum TXEQ setting is shortened because five Coefficients to be swept is less than ten Presets to be swept in the stage 0. In addition, in the stage 2, a target to be swept is not limited to Preset and thus the quality of output waveforms of data can be improved.

Then, if, in this stage 2, the Coefficient to be determined converges on a specific Coefficient, the TXEQ determination circuit 321 shifts to the stage 3 (A4 in FIG. 7). Note that the number of specific Coefficients in the stage 2 is preferably one.

The stage 3 is a stage that is limited to only the selected Coefficient. The selected Coefficient in the stage 3 is a specific Coefficient converged in the stage 2, indicated by the history data 201, like the selected Preset in the stage 2. An example of the selected Coefficient in the stage 3 is shown in FIG. 10.

In FIG. 10, a Coefficient in which a solid star is placed as indicated by symbol f1 is a selected Coefficient. When the TXEQ determination circuit 321 proceeds to the stage 3, it determines the selected Coefficient immediately as the optimum TXEQ setting.

In the stage 3, the optimum TXEQ setting is determined immediately. Thus, the time required to determine the optimum TXEQ setting is shortened further.

As described above, in the communication device 1 of the present embodiment, the history data 201 is stored in the nonvolatile memory 20, and learning using the history data 201 makes it possible to shorten the time to obtain the optimum TXEQ setting. In addition, the optimum TXEQ setting is selected from among not only Presets but all Coefficients, with the result that a better reception characteristics can be achieved.

Incidentally, the quality of output waveforms of data may vary with, for example, environmental temperature and temporal changes even though communications are performed with the same communication partner. Therefore, after the TXEQ determination circuit 321 reaches the stage 3, it is likely that the TXEQ setting that is determined immediately, in fact, will be no longer the optimum TXEQ setting.

As described above, the input buffer of the physical layer 33 has a function of evaluating the quality of output waveforms of data. When the quality of output waveforms of data, by the TXEQ setting that is immediately determined in the stage 3, is below a threshold value, the communication device 1 deletes the history data 201 relating to the communication partner from the nonvolatile memory 20 and executes the stage 0 again (sweeps all the Presets). As a result, the TXEQ determination circuit 321 will return to the stage 1. Thus, the communication device 1 of the present embodiment can appropriately cope with the case where, for example, the device characteristics are changed and accordingly the optimum TXEQ setting is changed.

Figure 11A:
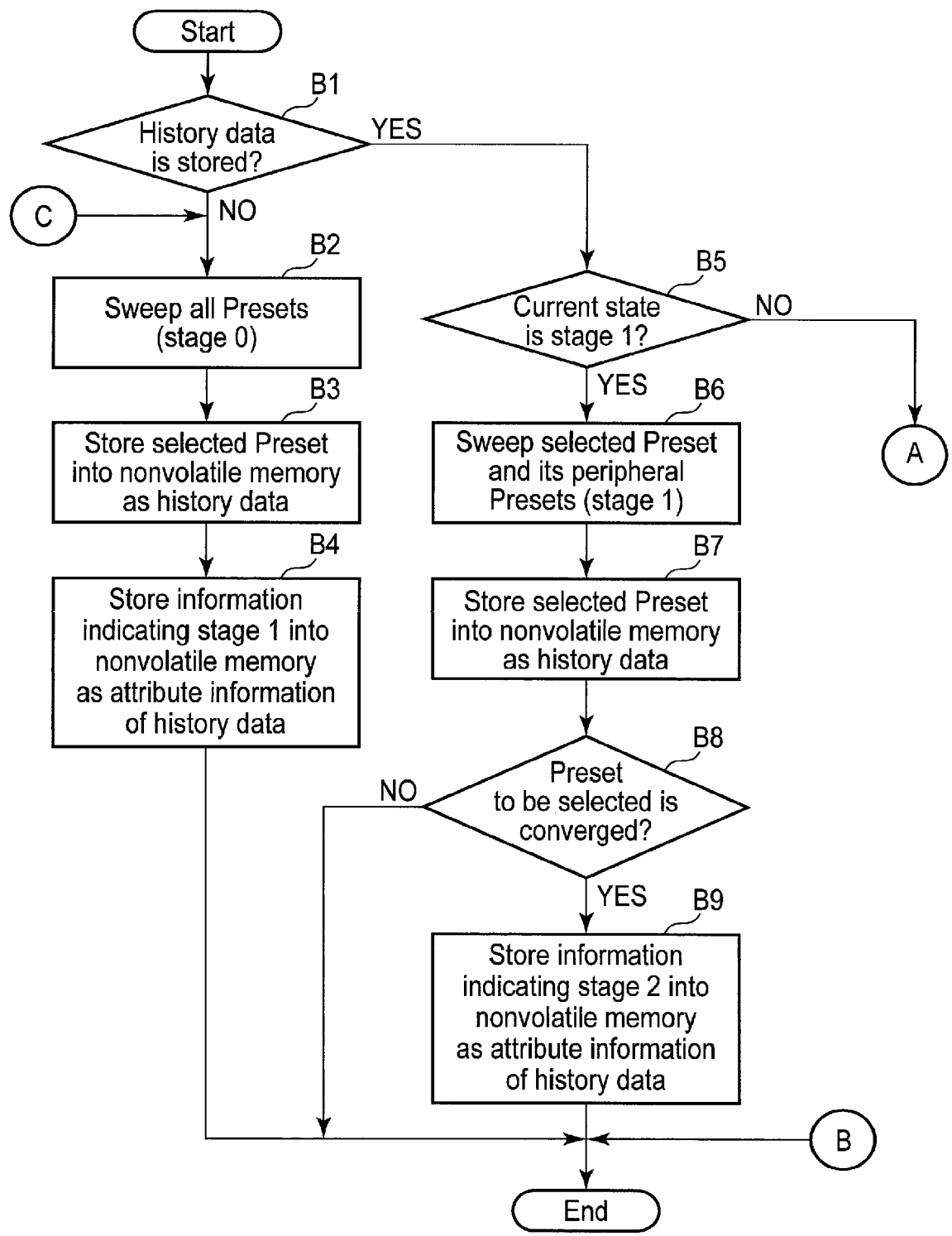
FIG. 11A is a first flowchart showing a procedure for Equalization to be executed in the communication device according to the embodiment.
Figure 11B:
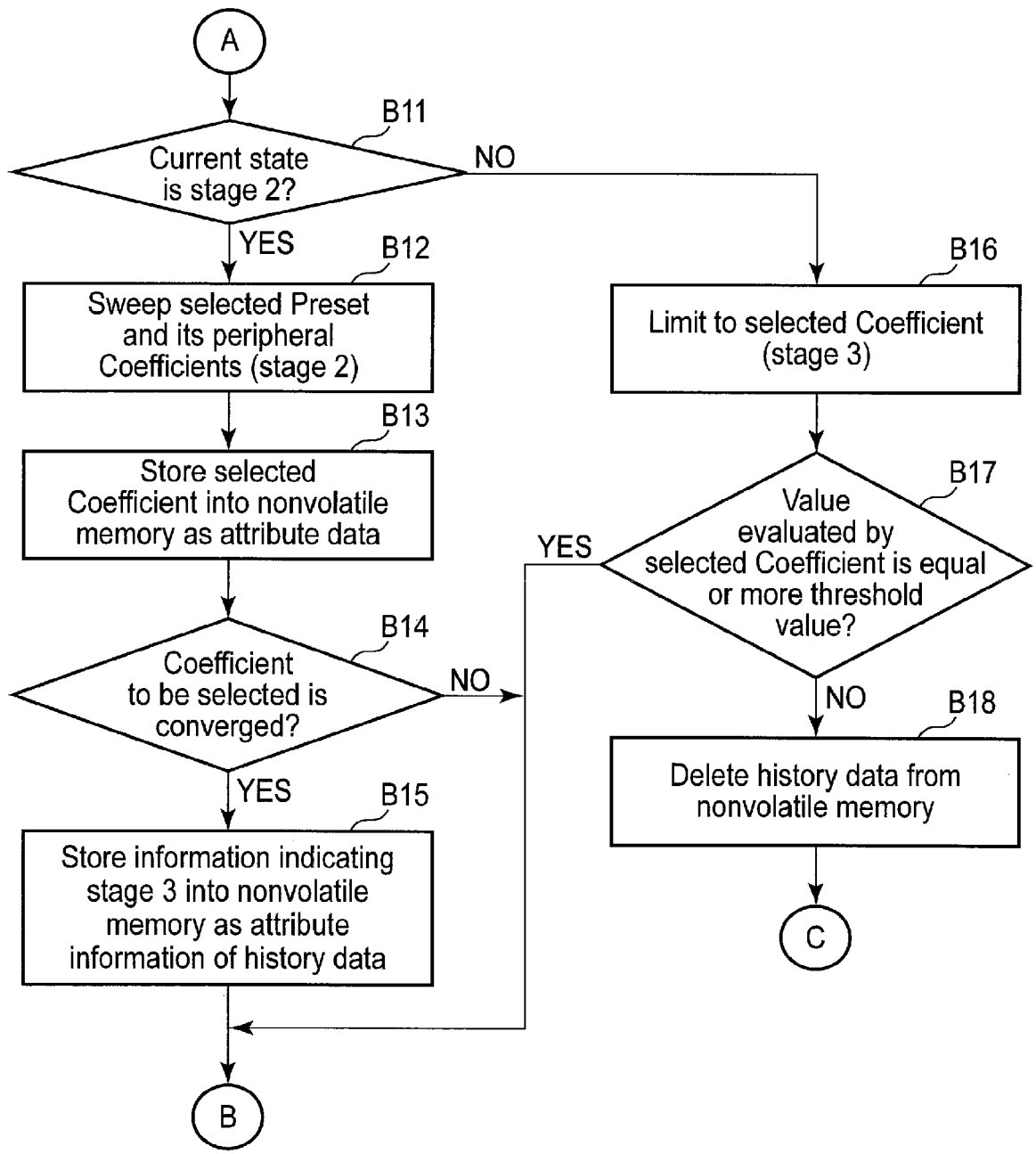
FIG. 11B is a second flowchart showing a procedure for Equalization to be executed in the communication device according to the embodiment.

FIGS. 11A and 11B are flowcharts illustrating a procedure for Equalization executed in the communication device 1 of the present embodiment.

The TXEQ determination circuit 321 confirms whether or not the history data 201 relating to the communication partner is stored in the nonvolatile memory 20 (step B1). If it is not stored, or if the current state is stage 0, (NO in step B1), the TXEQ determination circuit 321 sweeps all Presets (step B2).

The TXEQ determination circuit 321 stores the Preset selected by Sweep in step B2 into the nonvolatile memory 20 as the history data 201 (step B3). The TXEQ determination circuit 321 also stores information indicating stage 1 into the nonvolatile memory 20, together with the history data 201, as attribute information of the history data 201 (step B4), and terminates the Equalization. The history data 201 is stored in the non-volatile memory 20 such that a communication partner can be identified. Note that the order of steps B3 and B4 may be reversed.

When the history data 201 is stored (YES in step B1), the TXEQ determination circuit 321 confirms whether or not the current state is stage 1 (step B5). If the current state is stage 1 (YES in step B5), the TXEQ determination circuit 321 sweeps, for example, the Preset selected in the last Equalization and its peripheral Presets, which are represented by the history data 201, as options (step B6).

The TXEQ determination circuit 321 stores the Preset selected by Sweep in step B6 into the nonvolatile memory 20 as the history data 201 (step B7). The TXEQ determination circuit 321 confirms whether or not Preset to be selected is converged, from the history data 201 stored in the nonvolatile memory 20 (step B8). If it is converged (YES in step B8), the TXEQ determination circuit 321 stores information indicating stage 2 into the nonvolatile memory 20 as attribute information of the history data 201 (step B9), and terminates the Equalization. If it is not converged (NO in step B8), the TXEQ determination circuit 321 terminates the Equalization without executing step B9.

If the current state is stage 2 (NO in step B5, YES in step B11), the TXEQ determination circuit 321 sweeps a specific Preset converted in stage 1 and its peripheral Coefficients, which are represented by the history data 201, as options (step B12).

The TXEQ determination circuit 321 stores information relating to the Coefficient selected by Sweep in step B12 into the nonvolatile memory 20 as the history data 201 (step B13). The TXEQ determination circuit 321 confirms whether or not the selected Coefficient is converged, from the history data 201 stored in the nonvolatile memory 20 (step B14). If it is converged (YES in step B14), the TXEQ determination circuit 321 stores information indicating stage 3 into the nonvolatile memory 20 as attribute information of the history data 201 (step B15), and terminates the Equalization. If it is not converged (NO in step 814), the TXEO determination circuit 321 terminates the Equalization without executing step B15.

If the current state is stage 3 (NO in step B11), the TXEQ determination circuit 321 immediately selects a specific Coefficient converged in stage 2, as indicated by the history data 201 (step B16). In this case, the TXEQ determination circuit 321 confirms whether or not the quality of output waveforms of data by the Coefficient is equal to or more than a threshold value (step B17). If it is equal to or more than the threshold value (YES in step B17), the TXEQ determination circuit 321 terminates the Equalization. If it is less than the threshold value (NO in step B17), the TXEQ determination circuit 321 deletes the history data 201 from the nonvolatile memory 20 (step B18) and returns to step B2 to sweep all the presets.

As described above, the communication device 1 of the present embodiment can shorten the time to reach the optimum TXEQ setting. The communication device 1 can also achieve better reception characteristics since the optimum TXEQ setting is selected from all the Coefficients without being limited to Preset. Furthermore, the communication device 1 can appropriately cope with the case where the optimum TXEQ setting varies with, for example, a change in device characteristics. That is to say, the communication device 1 can shorten the time required for negotiation between devices.

It is assumed here that the TXEQ determination circuit 321 manages four stages of stages 0 to 3; however, various modifications can be made to each of the stages. For example, in stage 1, the selected Preset and its peripheral Presets may be replaced with a selected Preset and its peripheral Coefficients as options. In this case, the peripheral Coefficients in stage 2 are Coefficients of which values of coefficients adjacent to that of the selected Preset, whereas the peripheral Coefficients in stage 1 are Coefficients of which the sum of differences from values of coefficients of the selected Preset is a fixed value or less.

Further, one of the four stages 0 to 3 may be omitted. For example, the stage 1 may be omitted to sweep in stage 2 with a Preset selected in stage 0 and Coefficients of which values of coefficients adjacent to that of the Preset as options. Alternatively, stage 2 may be omitted to immediately determine, in stage 3, Coefficient converged in stage 1.

FIG. 12 is a block diagram showing an example in which the communication device 1 of the present embodiment is achieved as a storage device 4. Note that the communication device 1 may also be achieved as a host device 3.

The storage device 4 includes a controller 41 configured by a semiconductor integrated circuit such as an SoC, a buffer memory 42 such as a DRAM, and a storage 43 such as NAND flash memory. In response to a command from the host device 3, the controller 41 executes writing data to the storage 43 and reading data from the storage 43 using the buffer memory 42 as a temporary storage area for the writing/reading data. The controller 41 includes the communication controller 30 described above.

The communication controller 30 of the controller 41 controls communications between the storage device 4 and the host device 3. The communication controller 30 includes a TXEQ determination circuit (algorithm) 321 as described above. The TXEQ determination circuit 321 stores TXEQ determination history data 201 in the storage 43. The TXEQ determination circuit 321 executes Equalization together with the host device 3, based on the TXEQ determination history data 201 stored in the storage 43.

As described above, the Equalization based on the TXEQ determination history data 201, which is executed by the TXEQ determination circuit 321, allows the storage device 4 to shorten the time to reach the optimum TXEQ setting and achieve better reception characteristics. The Equalization also allows the storage device 4 to appropriately cope with the case where the optimum TXEQ setting varies with, for example, a change in device characteristics.

Therefore, the storage device 4 that is an example of the communication device 1 of the present embodiment can shorten the start-up time until it is powered on to start to communicate with the host device 3.

The storage device 4 may also store information of environmental temperature when sweeping of Preset is executed, or it is determined that Preset to be selected is converged, in the storage 43 as attribute information of the history data 201.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device comprising:
a nonvolatile memory;
a reception circuit configured to receive data from an external device via an interface; and
a control circuit configured to determine an output waveform of the data to be received from the external device by the reception circuit, wherein:
the control circuit is configured to:
store information relating to the output waveform into the nonvolatile memory in response to determining of the output waveform of the data from among N (N is a natural number of three or more) types of output waveforms, the N types of output waveforms being set by one or more coefficients, respectively;
determine the output waveform of the data from among M or less types of output waveforms in the N types of output waveforms (M<N) (M is a natural number of N−2 or more) based on the information stored in the nonvolatile memory, when the information is stored in the nonvolatile memory, and
select the M or less types of output waveforms from among a part or all of the N types of output waveforms, a difference between values of the one or more coefficients of the M or less types of output waveforms and the values of the one or more coefficients of the output waveform indicated by the information stored in the nonvolatile memory being a first threshold value or less.

2. The communication device of claim 1, wherein:
the control circuit is configured to select the M or less types of output waveforms based on values of one or more coefficients of the output waveform indicated by the information stored in the nonvolatile memory and values of one or more coefficients of a part or all of the N types of output waveforms.

3. The communication device of claim 1, wherein when a number of types of output waveforms determined in a first stage converges to a second threshold value or less, the control circuit is configured to proceed to a second stage, the first stage being a stage in which the control circuit selects the M or less types of output waveforms from among the part or all of the N types of output waveforms and determines the output waveform of the data from among the selected M or less types of output waveforms, the second stage being a stage in which the control circuit determines the output waveform of the data from among candidates of output waveforms, a value of part of the one or more coefficients of the candidates of output waveforms coinciding with a value of part of the one or more coefficients of the output waveforms of which the number of types is the second threshold value or less in the N types of output waveforms, values of coefficients other than the part of the one or more coefficients of the candidates of output waveforms being continuous with values of coefficients of the output waveforms of which the number of types is the second threshold value or less.

4. The communication device of claim 3, wherein the control circuit is configured to proceed to a third stage when the output waveform determined in the second stage converges to one type, the third stage being a stage in which the control circuit determines an output waveform of the one type as the output waveform of the data.

5. The communication device of claim 4, wherein the control circuit is configured to erase the information stored in the nonvolatile memory and proceed to an initial stage, when quality of an output waveform of data transmitted from the external device with the output waveform determined in the third stage is below a third threshold value, the initial stage being a stage in which the control circuit determines an output waveform of the data from among the N types of output waveforms.

6. The communication device of claim 1, wherein the part of the N types of output waveforms comprise L (L<N, L>M) types of output waveforms designated in advance from among the N types of output waveforms.

7. The communication device of claim 1, wherein:
the N types of output waveforms are each set by one or more coefficients; and
the control circuit is configured to select the M or less types of output waveforms from among the N types of output waveforms, a value of part of the one or more coefficients of the M or less types of output waveforms coinciding with a value of part of the one or more coefficients of the output waveforms indicated by the information stored in the nonvolatile memory, values of coefficients other than the part of the one or more coefficients of the M or less types of output waveform is being continuous with values of coefficients of the output waveforms indicated by the information stored in the nonvolatile memory.

8. The communication device of claim 1, wherein when the output waveform determined in a first stage converges to one type, the control circuit is configured to proceed to a second stage, the first stage being a stage in which the control circuit selects the M or less types of output waveforms from among the N types of output waveforms and determines the output waveform of the data from among the selected M or less types of output waveforms, the second stage being a stage in which the control circuit determines an output waveform of the one type as the output waveform of the data.

9. The communication device of claim 8, wherein the control circuit is configured to erase the information stored in the nonvolatile memory and proceed to an initial stage, when quality of an output waveform of data transmitted from the external device with the output waveform determined in the second stage is below a third threshold value, the initial stage being a stage in which the control circuit determines an output waveform of the data from among the N types of output waveforms.

10. The communication device of claim 1, wherein when an output waveform determined in a first stage converges to one type, the control circuit is configured to proceed to a second stage, the first stage being a stage in which the control circuit selects the M or less types of output waveforms from among L (L<N, L>M) types of output waveforms designated in advance from the N types of output waveforms and determines the output waveform of the data from the selected M or less types of output waveforms, the second stage being a stage in which the control circuit determines an output waveform of the one type as the output waveform of the data.

11. The communication device of claim 10, wherein the control circuit is configured to erase the information stored in the nonvolatile memory and proceed to an initial stage, when quality of an output waveform of data transmitted from the external device with the output waveform determined in the second stage is below a third threshold value, the initial stage being a stage in which the control circuit determines an output waveform of the data from among the N types of output waveforms.

12. A method of determination of an output waveform of data from an external device for a communication device comprising a nonvolatile memory and a reception circuit configured to receive the data from the external device via an interface, the method comprising:
    storing information relating to the output waveform into the nonvolatile memory in response to determination of the output waveform of the data from among N (N is a natural number of three or more) types of output waveforms, the N types of output waveforms being set by one or more coefficients, respectively;
    determining the output waveform of the data from among M or less types of output waveforms in the N types of output waveforms (M<N) (M is a natural number of N−2 or more) based on the information stored in the nonvolatile memory, and
    selecting the M or less types of output waveforms from among a part or all of the N types of output waveforms, a difference between values of the one or more coefficients of the M or less types of output waveforms and the values of the one or more coefficients of the output waveform indicated by the information stored in the nonvolatile memory being a first threshold value or less.

13. The method of claim 12, further comprising:
    selecting the M or less types of output waveforms based on values of one or more coefficients of the output waveform indicated by the information stored in the nonvolatile memory and values of one or more coefficients of a part or all of the N types of output waveforms.

14. The method of claim 13, further comprising proceeding, when a number of types of output waveforms determined in a first stage converges to a second threshold value or less, to a second stage, the first stage being a stage in which the M or less types of output waveforms are selected from among the part or all of the N types of output waveforms and the output waveform of the data is determined from among the selected M or less types of output waveforms, the second stage being a stage in which the output waveform of the data is determined from among candidates of output waveforms, a value of part of the one or more coefficients of the candidates of output waveforms coinciding with a value of part of the one or more coefficients of the output waveforms of which the number of types is the second threshold value or less in the N types of output waveforms, values of coefficients other than the part of the one or more coefficients of the candidates of output waveforms being continuous with values of coefficients of the output waveforms of which the number of types is the second threshold value or less.

15. The method of claim 12, further comprising proceeding, when the output waveform determined in a first stage converges to one type, to a second stage, the first stage being a stage including selecting the M or less types of output waveforms from among the N types of output waveforms and determining the output waveform of the data from among the selected M or less types of output waveforms, the second stage being a stage including determining an output waveform of the one type as the output waveform of the data.

16. The method of claim 15, further comprising erasing the information stored in the nonvolatile memory and proceeding to an initial stage, when quality of an output waveform of data transmitted from the external device with the output waveform determined in the second stage is below a third threshold value, the initial stage being a stage including determining an output waveform of the data from among the N types of output waveforms.

17. The method of claim 12, further comprising proceeding, when an output waveform determined in a first stage converges to one type, to a second stage, the first stage being a stage including selecting the M or less types of output waveforms from among L (L<N, L>M) types of output waveforms designated in advance from the N types of output waveforms and determining the output waveform of the data from the selected M or less types of output waveforms, the second stage being a stage including determining an output waveform of the one type as the output waveform of the data.

18. The method of claim 17, further comprising erasing the information stored in the nonvolatile memory and proceeding to an initial stage, when quality of an output waveform of data transmitted from the external device with the output waveform determined in the second stage is below a third threshold value, the initial stage being a stage including determining an output waveform of the data from among the N types of output waveforms.

19. The method of claim 12, wherein the part of the N types of output waveforms comprise L (L<N, L>M) types of output waveforms designated in advance from among the N types of output waveforms.

* * * * *